May 31, 1932.  E. P. GRAY  1,860,892
MUFFLER
Filed April 11, 1929
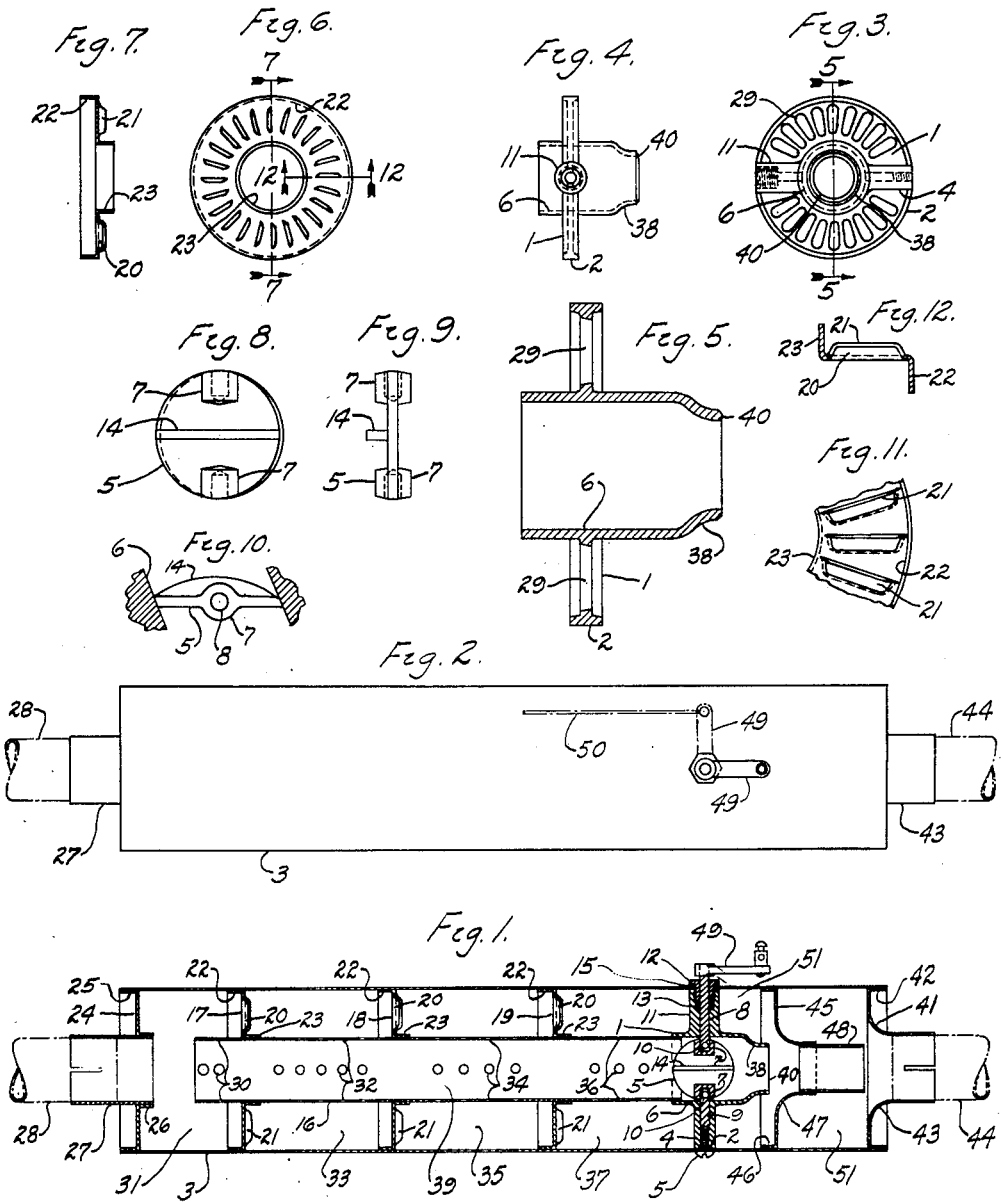
INVENTOR.
Emmet P. Gray
BY
George B. Ingersoll
ATTORNEY.

Patented May 31, 1932

1,860,892

UNITED STATES PATENT OFFICE

EMMET P. GRAY, OF DETROIT, MICHIGAN

MUFFLER

Application filed April 11, 1929. Serial No. 354,232.

My invention relates to improvements in mufflers for controlling the discharge of exhaust gas from engines, and the objects of my improvement are, first, to provide a muffler with a valve housing having a discharge nozzle thereon; second, to provide a muffler valve housing through which gas may pass into a common discharge nozzle, both when valve is closed and open; third, to provide a two way muffler having means for whirling the gases in one of its ways to unite with the gas flowing through the other of its ways; fourth, to provide a muffler having louvered members located around a central chamber; fifth, to provide a muffler with means for cooling the gases flowing therethrough by accelerating their contact with the cooler outside walls of said muffler; and sixth, to provide a muffler having means for straightening the whirling flow of gases therethrough.

I attain these objects by the mechanism illustrated in the accompanying drawings, in which—

Fig. 1 is a vertical section of the muffler; Fig. 2, a plan view of the muffler; Fig. 3, an end view of the valve housing; Fig. 4, a side view of the valve housing; Fig. 5, a sectional view of the valve housing on the line 5—5, Fig. 3; Fig. 6, an end view of a louver member; Fig. 7, a sectional view of the louver member on the line 7—7, Fig. 6; Fig. 8, a front view of the valve member; Fig. 9, a side view of the valve member; Fig. 10, an end view of the valve member in its closed position; Fig. 11, an enlarged view of the louvers in the louvered member; and Fig. 12, a sectional view of the louvered member on the line 12—12, Fig. 6.

Similar numerals refer to similar parts throughout the several views.

The housing 1 is provided with the shoulder 2 over which fits the outer shell 3 of the muffler. The housing 1 is provided with a threaded boss 4 into which is threaded the screw 5 for fastening the shell 3 in position on the housing 1, the screw 5 passing through a hole in the shell 3. A plurality of screws 5 and bosses 4 may be used if desired. The valve 5 is mounted in the passage 6 of the housing 1, the valve 5 being made of the proper diameter to effectively close the passage 6 when moved to an angular position of approximately 20 degrees from its right angle position to the walls of the passage 6, as shown in Fig. 10. This always insures the valve 5 being moved to an effective closed position without the danger of the valve 5 being moved entirely through and beyond its right angle position to the walls of the pasasge 6. The valve 5 is also provided with the bosses 7 and the shafts 8 and 9 are secured in the bosses 7 by means of the pins 10. The pin 9 is supported in its bearing in the boss 4. The pin 8 is supported in its bearing in the boss 11 of the housing 1 and also in the gland bushing 12 which is threaded into the boss 11 of the housing 1, the bushing 12 being utilized to compress the packing material 13, thus maintaining a tight joint about the shaft 8 and preventing the escape of gases around same.

The valve 5 may be constructed if desired, with the extending rib 14 for facilitating the holding of said valve when being machined. The bushing 12 is also used for locking the outer shell 3 to the housing 1, the bushing 12 passing through a hole in the outer shell 3. Also the bushing 12 compresses the gasket 15 against the shell 3, thus effectively preventing the escape of gases through the outer shell 3.

The inner shell or tube 16 is supported, at its rear end, in the housing 1 and throughout its remaining length by the baffle plates 17, 18, and 19, which are provided with openings, apertures, or louvers 20. The louvers in the plates 17, 18, and 19 are formed by partially punching out a portion of the wall metal of the plates, leaving said portion sloping outwardly from the wall of the plates as at 21. It is to be especially noted that the sloping portion 21 adjacent the openings 20 is so arranged that the gases or fluids passing through said openings will be given a whirling or rotating motion.

The baffle plates 17, 18, and 19 are each provided with a flanged shoulder 22 for attaching to and supporting the outer shell 3 and a flanged shoulder 23 for attaching to and supporting the shell or tube 16.

The front head 24 of the muffler is provided with a flanged shoulder 25 for attaching to and supporting the outer shell 3 and a flanged shoulder 26 for attaching to and supporting the inlet tube 27 which receives the exhaust inlet pipe 28 (as shown by dotted lines) which is connected with the engine to be operated with the muffler.

The housing 1 is provided with a series of holes or openings 29 lying between the outer shell 3 and the valve portion of the housing 1. The holes 29 are tapered with their larger areas toward the front or inlet end of the muffler. Also the openings 29 may be of the desired shape and size to properly receive the gases or fluids flowing through them from the inlet pipe 28.

The inner shell or tube 16 may be provided with a series of holes 30 connecting with the chamber 31 lying between the front head 24 and the forward end of the tube 16. The inner shell or tube 16 may be further provided with a series of holes 32 connecting with the chamber 33 lying between the plate 17 and the plate 18.

The inner shell or tube 16 may be further provided with a series of holes 34 connecting with the chamber 35 lying between the plate 18 and the plate 19. The inner shell or tube 16 may be further provided with a series of holes 36 connecting with the chamber 37 lying between the plate 19 and the housing 1.

It is to be noted that the positions of the plates 17, 18, and 19 may be varied or spaced as to the best proportion and number to determine the flow of the gases or fluids to or from the chambers 31, 33, 35 and 37, the tube 16, and the housing 1. The housing 1 is also provided with a collector portion 38 which tends to close the end of the chamber 39 formed by the tube 16 and the passage 6 of the housing 1, the discharge end 40 of the collector portion being of smaller area than the chamber 39. The collector portion 38 of the housing 1 is formed so that it provides Venturi means for increasing the speed of the gases or fluids flowing out of the chamber 39.

It is to be noted that the series of holes or openings 29 in the housing 1 may be formed with a louver portion if it is desired to continue the whirling or rotating of the gases or fluids beyond the valve housing. Also the housing 1 may be used with the holes as shown when it is desired to utilize the holes 29 therein for straightening out or further preventing the gases or fluids from continuing in a whirling or rotating path.

It is to be noted that the housing 1 may be placed at the extreme end of an outer shell 3 thus allowing the discharge end 40 of the collective portion 38 to form the tail piece of the muffler assembly. Also the outer shell or tube 3 may be of the desired length to permit the member 41 to be placed at the rear of the shell 3, the member 41 being provided with a flanged shoulder 42 for attaching to and supporting the shell 3. The member 41 may be formed with an extending portion 43 which in turn may receive the discharge or tail pipe 44, as shown by dotted lines. The member 45 may be placed between the housing 1 and the member 41 and is provided with a flanged shoulder 46 and an extending portion 47 to receive and support the tube 48, the tube 48 being placed in line with the discharge end 40 of the housing 1 and the discharge or tail pipe 44.

The control lever 49 is connected by a wire, cable, or rod 50, with the means used, by the operator of a motor vehicle, for the control of the fuel throttle of the carburetor of the engine. This is preferably connected with the foot accelerator controlling the fuel throttle, although, if desired, the control lever 49 may be connected with the manual throttle control for the engine.

It is to be noted that the control lever 49 is shown, in Fig. 2 out of projection with Fig. 1, the operating cable 50 here extending parallel with the muffler. However, it is to be understood that the control lever 49 may be located in the most convenient position for extending the operating cable 50 or its equivalent wire or rod, to connect with the mechanism operated, by the driver of a motor vehicle, for controlling the throttle in the intake passage of the carburetor of the engine with which the muffler is used. In operation, the gases enter the forward chamber 31 through the inlet pipe 28 and the tube 27. If the valve 5 is fully or nearly closed the gases will tend to fill the entire muffler quickly, practically with the first operation of the engine. The gases will overflow outwardly through the series of holes 30, 32, 34, and 36 into the chambers 31, 33, 35, and 37. As the gases quickly fill the chamber 39 when the valve 5 is fully or nearly closed, in a set position corresponding to a slow or an idling speed of the engine, the gases will tend to fill the chamber 31, passing through the open space between the ends of the tubes 16 and 27 and the series of holes 30. It is to be here noted that the tube 16 may be extended to connect or unite with the tube 26, if desired, the series of holes 30 being increased in number and size to properly determine the amount of the gases passing from the tube 16 into the chamber 31.

The gases which have filled the chamber 31 will tend to pass through the plate 17 into the chamber 33, the gases leaving the openings 20 with a whirling or rotating motion, due to their being thus deflected by the sloping portions 21 of the plate 17. In chamber 33, the gases will be united with the gases which have expanded or passed outwardly from the chamber 39 through the series of holes 32. The united gases in the chamber 33 will be further given whirling impetus by passing through the openings in plate 18 to the chamber 35, where they will be further joined and united with the gases which have expanded or passed outwardly from the chamber 39 through the series of holes 34.

The united gases in the chamber 35 will be given still further whirling impetus by passing through the openings in plate 19 to the chamber 37, where they will be further united with the gases which have expanded or passed outwardly from the chamber 39 through the series of holes 36.

When the gases pass from the chamber 37 through the openings 29 in the housing 1, as shown, the gases are caused to straighten out from their whirling path and are caused to flow onwardly to the tail pipe 44 without a pronounced whirling or rotating motion. However if it is desired to continue the whirling motion of the gases beyond the housing 1, this may be accomplished by providing the openings 29, in the housing 1, with louvers.

It is to be especially noted that in my invention, the gases may pass through the holes 29 in the housing 1 both when the valve 5 is wholly closed and when the valve 5 is wholly or partially open. When the engine with which the muffler is connected, is accelerated in speed, with its consequent greater displacement of exhaust gases, the valve 5 will be automatically opened, by means of the operating member 50 connected with the engine throttle control means, operated by the driver of the motor vehicle, with the result that the gases may enter the inner shell or tube 16 and pass at high velocity directly through the chamber 39, the passage 6, and out of the discharge end 40 of the housing 1 and thus out through the tube 48 and the tail pipe 44. My invention thus provides a muffler having an increased efficiency of gas flow together with a valve which opens and closes automatically to the proper degree to maintain an equalized pressure in the muffler.

It is to be further noted that the gases passing through the chamber 39, when the valve 5 is wholly or partially opened, will be increased in speed as it emerges from the discharge end 40 of the housing 1. This increased speed of the gases will tend to cause the slower moving gases passing through the openings 29, in housing 1, to be united or pulled with the faster moving gases emerging from the discharge end 40, thus accelerating the evacuation or ejection of gases from the outer chambers 31, 33, 35, and 37. When the valve 5 is in a partially closed position so that the flow of gases is retarded therethrough, the gases passing through the openings 29, in the housing 1, into the chamber 51 will be accelerated in speed as they further pass through the tube 48. This increase of the speed of the gases through the tube 48 will in turn cause the slower moving gases passing through the partially opened valve 5 to be united or pulled with the faster moving gases emerging through the tube 48, thus accelerating the evacuation or ejection of the gases from the chamber 39.

The member 45 may also, if desired, be provided with openings similar to those of the housing 1 and the plates 17, 18, and 19.

It is also to be especially noted that, in my invention, the gases passing through the plates 17, 18, and 19 will be whirled or rotated and their centrifugal motion will carry them against the inner surface of the outer diameter of the shell 3, thus providing a cushion of gas which will wipe the inner surface of the outer wall and provide more efficient cooling of the gases, the heat being more efficiently dissipated through the walls of the shell 3 to the cooler air on the outside of the shell 3.

I claim:

1. In a muffler, the combination of a hollow member having an inlet end, a housing in said hollow member, said housing being located at the end opposite to the inlet end of said hollow member, said housing being provided with a discharge nozzle, a valve in said housing, said valve being placed in alignment with the inlet of said hollow member and the discharge nozzle of said housing, a single tubular member extending forwardly from said housing to a point adjacent but unconnected with the inlet end of said hollow member, and a plurality of independently located wall members, each of said wall members being continuous throughout their peripheral length, each of said wall members being provided with means to cause gases to pass therethrough with a whirling motion.

2. In a muffler, the combination of a continuous tubular member, a perforated member located within said continuous tubular member so as to form a space therebetween, a housing member secured to said continuous tubular member, said housing member being provided with ports communicating with the space between said continuous tubular member and said perforated member, said housing member being further provided with a port communicating with said perforated member, means for imparting a whirling motion to the gases or fluids in the space between said continuous tubular member and said perforated member, a valve pivotally mounted in said housing member, and means for operating said valve, the operation of said valve tending to permit equalization of the pressure in said continuous tubular member and said perforated member.

3. In a muffler connected with an engine having a throttle control means, the combination of an outer member having an inlet and an outlet, a housing located in said outer member, said housing having a main port together with a plurality of smaller ports, said housing being further provided with ejector means in alignment with the main port of said housing, a valve pivotally mounted in the main port of said housing, a shaft for operating said valve, said shaft passing through said housing and said outer member, packing material around said shaft, packing material on the outside of said outer member, a member for compressing said first mentioned packing around said shaft, said last mentioned member further compressing said last mentioned packing material against said outer shell, means for operating said shaft and said valve in conjunction with the throttle control means of the engine, a perforated member in alignment with the main port of said housing, louvered members between said outer member and said perforated member, and ejector means in said outer member, said last mentioned ejector means being located between the ejector means of said housing and the outlet of said outer member.

4. In a muffler, the combination of a tubular member having an inlet and outlet, a tubular member within said first mentioned tubular member, a plurality of disc members between said first mentioned and said second mentioned tubular members, said disc members being provided with means for causing gases to follow a helical path, a valve member in said second mentioned tubular member, and a disc member provided with a discharge nozzle, said last mentioned disc member being suitably supported between said second mentioned tubular member and the outlet of said first mentioned tubular member.

Dearborn, Mich., April 8th, 1929.

EMMET P. GRAY.